(12) United States Patent
Crabtree et al.

(10) Patent No.: US 10,402,906 B2
(45) Date of Patent: Sep. 3, 2019

(54) QUANTIFICATION FOR INVESTMENT VEHICLE MANAGEMENT EMPLOYING AN ADVANCED DECISION PLATFORM

(71) Applicant: Fractal Industries, Inc., Reston, VA (US)

(72) Inventors: Jason Crabtree, Vienna, VA (US); Andrew Sellers, Monument, CO (US)

(73) Assignee: QOMPLX, Inc., Reston, VA (US)

( * ) Notice: Subject to any disclaimer, the term of this patent is extended or adjusted under 35 U.S.C. 154(b) by 194 days.

(21) Appl. No.: 15/376,657

(22) Filed: Dec. 13, 2016

(65) Prior Publication Data

US 2017/0124655 A1    May 4, 2017

Related U.S. Application Data

(63) Continuation-in-part of application No. 15/237,625, filed on Aug. 15, 2016, which is a continuation-in-part of application No. 15/206,195, filed on Jul. 8, 2016, which is a continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, which is a continuation-in-part of application No. 15/091,563, filed on Apr. 5, 2016, and a continuation-in-part of application No. 14/986,536, filed on Dec. 31, 2015, and a continuation-in-part of application No. 14/925,974, filed on Oct. 28, 2015.

(51) Int. Cl.
*G06Q 40/06* (2012.01)
*G06Q 40/04* (2012.01)

(52) U.S. Cl.
CPC ............ *G06Q 40/06* (2013.01); *G06Q 40/04* (2013.01)

(58) Field of Classification Search
CPC .............................. G06Q 40/06; G06Q 40/04
See application file for complete search history.

(56) References Cited

U.S. PATENT DOCUMENTS 6,321,212 B1 * 11/2001 Lange .................... G06Q 40/00
                                                              705/35
6,594,643 B1 *  7/2003 Freeny, Jr. ............. G06Q 40/04
                                                              705/36 R (Continued)

FOREIGN PATENT DOCUMENTS

WO          0163534 A2     8/2001
WO      2015094545 A1     6/2015

*Primary Examiner* — Yonas A Bayou
(74) *Attorney, Agent, or Firm* — Brian R. Galvin; Brian S. Boon; Galvin Patent Law, LLC

(57) ABSTRACT

A system for investment vehicle quantification employing an advanced decision platform comprises a data retrieval module configured to retrieve investment related data. A predictive analytics module performs predictive analytics on investment data using investment specific and machine learning functions. A predictive simulation module performs predictive simulation functions on the investment data. An indexed global tile module retrieves geospatial and map overlay data, and serves as an interface for geospatial data requests. An interactive display module displays the results of predictive analytics and predictive simulation and both real world and simulated geospatial data.

18 Claims, 9 Drawing Sheets

(56) References Cited

U.S. PATENT DOCUMENTS

| | | | |
|---|---|---|---|
| 20,050,165 | | 7/2005 | Yeung et al. |
| 7,171,515 | B2 | 1/2007 | Ohta et al. |
| 7,389,262 | B1 * | 6/2008 | Lange .................... G06Q 40/00 705/35 |
| 7,827,094 | B2 * | 11/2010 | Bloom .................... G06Q 40/00 705/35 |
| 8,504,454 | B2 * | 8/2013 | Asher .................... G06Q 40/00 705/35 |
| 8,756,142 | B1 * | 6/2014 | Keiser .................. G06Q 10/063 705/37 |
| 9,218,720 | B2 * | 12/2015 | Costakis ................ G06Q 10/00 |
| 2001/0047291 | A1 * | 11/2001 | Garahi ................. G06Q 10/063 705/7.11 |
| 2001/0051540 | A1 * | 12/2001 | Hindman ............... G06Q 50/34 463/25 |
| 2002/0099640 | A1 * | 7/2002 | Lange .................... G06Q 40/00 705/37 |
| 2003/0115128 | A1 * | 6/2003 | Lange .................... G06Q 30/08 705/37 |
| 2003/0236738 | A1 * | 12/2003 | Lange .................... G06Q 30/08 705/37 |
| 2004/0138977 | A1 * | 7/2004 | Tomkins ................ G06Q 40/02 705/36 R |
| 2006/0190378 | A1 | 8/2006 | Szydlo |
| 2007/0168370 | A1 | 7/2007 | Hardy |
| 2010/0169237 | A1 | 7/2010 | Howard et al. |
| 2014/0359552 | A1 | 12/2014 | Misra et al. |
| 2016/0006629 | A1 | 1/2016 | Ianakiev et al. |

* cited by examiner

QUANTIFICATION FOR INVESTMENT VEHICLE MANAGEMENT EMPLOYING AN ADVANCED DECISION PLATFORM

CROSS-REFERENCE TO RELATED APPLICATIONS

This application is a continuation-in-part of U.S. patent application Ser. No. 15/237,625, titled "DETECTION MITIGATION AND REMEDIATION OF CYBERATTACKS EMPLOYING AN ADVANCED CYBER-DECISION PLATFORM", and filed on Aug. 15, 2016, which is a continuation-in-part of U.S. patent application Ser. No. 15/206,195, titled "ACCURATE AND DETAILED MODELING OF SYSTEMS WITH LARGE COMPLEX DATASETS USING A DISTRIBUTED SIMULATION ENGINE", and filed on Jul. 8, 2016, which is continuation-in-part of U.S. patent application Ser. No. 15/186,453, titled "SYSTEM FOR AUTOMATED CAPTURE AND ANALYSIS OF BUSINESS INFORMATION FOR RELIABLE BUSINESS VENTURE OUTCOME PREDICTION" and filed on Jun. 18, 2016, which is a continuation-in-part of U.S. patent application Ser. No. 15/166,158, titled "SYSTEM FOR AUTOMATED CAPTURE AND ANALYSIS OF BUSINESS INFORMATION FOR SECURITY AND CLIENT-FACING INFRASTRUCTURE RELIABILITY", and filed on May 26, 2016, which is a continuation-in-part of U.S. patent application Ser. No. 15/141,752, titled "SYSTEM FOR FULLY INTEGRATED CAPTURE, AND ANALYSIS OF BUSINESS INFORMATION RESULTING IN PREDICTIVE DECISION MAKING AND SIMULATION, and filed on Apr. 28, 2016, which is a continuation-in-part of U.S. patent application Ser. No. 14/925,974, titled "RAPID PREDICTIVE ANALYSIS OF VERY LARGE DATA SETS USING THE DISTRIBUTED COMPUTATIONAL GRAPH" and filed on Oct. 28, 2015, and is also a continuation-in-part of U.S. patent application Ser. No. 14/986,536, titled "DISTRIBUTED SYSTEM FOR LARGE VOLUME DEEP WEB DATA EXTRACTION", and filed on Dec. 31, 2015, and is also a continuation-in-part of U.S. patent application Ser. No. 15/091,563, titled "SYSTEM FOR CAPTURE, ANALYSIS AND STORAGE OF TIME SERIES DATA FROM SENSORS WITH HETEROGENEOUS REPORT INTERVAL PROFILES", and filed on Apr. 5, 2016, the entire specification of each of which is incorporated herein by reference in its entirety.

BACKGROUND OF THE INVENTION

Field of the Invention

The present invention is in the field of use of computer systems in business information management, operations and predictive planning. Specifically, the use of an advanced decision system to provide ongoing market environment quantification for investment trading business operations.

Discussion of the State of the Art

Investment vehicle trading as a business field would certainly be characterized as highly reliant on the acquisition and analysis of information. Each trader, relies on the capture, cleaning, normalization and analysis of data pertaining to not only the current worth of the target traded objected, but performance or value history and a potentially overwhelming body of trade environmental data which may or may not directly pertain to the trade item of interest but all of which may have highly significant effect on both short term and long term worth. As with most fields, the available information in support of each trade transaction has grown considerably and continues to expand. Multiple investment related companies have begun to investigate, even offer, services which aim to place more information into investors hands in a timely fashion, but little has been done, to date, in an attempt to alleviate the overwhelming burden of sifting through, correlating and forming informed plans of trading action from the torrents of data and multiple differing opinion currently offered.

There have been several recent developments in more general business software that have arisen with the purpose of streamlining or automating either business data analysis or business decision process which might be harnessed to aid in investment trade decision making PLANATIR™ offers software to isolate patterns in large volumes of data, DATABRICKS™ offers custom analytics services, ANAPLAN™ offers financial impact calculation services. There are other software sources that mitigate some aspect of business data relevancy identification in isolation, but these fail to holistically address the entire scope of insurance data analysis. Analysis of that data and business decision automation, however, remains out of their reach. Currently, none of these solutions handle more than a single aspect of the whole task, cannot form predictive analytic data transformations and, therefore, are of little use in the area of trade profitability prediction, where the only solution is a very complex process requiring sophisticated integration of the tools above.

While the ability to retrieve large amounts of data has greatly increased and there are packages that purport to aid investors and traders better command the wealth of investment vehicle and trading support information they only serve to add to the overload of information described above, and, to be of optimal use, must be carefully analyzed by any business information management system purporting to provide reliable insurance field prediction.

What is needed is a fully integrated system that retrieves risk, insurance market and capital relevant information from many heterogeneous sources using a scalable, expressively scriptable, connection interface, identifies and analyzes that high volume data, transforming it into a useful format. Such a system must then use that data to drive an integrated, highly scalable simulation engine which may employ combinations of the system dynamics, discrete event and agent based paradigms within a simulation run such that the most useful and accurate data transformations are obtained and stored for the human analysts such as actuaries, underwriters and financial officers to rapidly digest the presented information, readily comprehend any predictions or recommendations and then creatively respond to optimize client insurance coverage and insurer business interests including profit. This multi-method information insurance risk and coverage information capture, analysis, transformation, outcome prediction, and presentation system forming a "business operating system."

SUMMARY OF THE INVENTION

Accordingly, the inventor has developed a system for trading environment quantification for investment vehicle management employing an advanced cyber-decision platform. In a typical embodiment, the advanced decision platform, a specifically programmed usage of the business operating system, continuously retrieves data related to investment vehicle worth, pricing trends, procurement options, investment risk hedging possibilities, and environmental factors related to the investment vehicle. The system then uses this and other data to formulate the current worthiness of a particular investment choice and risk factors associated with investment in that area. The system may also use that data to create predictive simulations concerning future performance and risk having to do with the intended investment planning such as increase in worth, and possible splits or loss of worth for various reasons, stagnation, or collapse, all based on all of the available data and expert opinion. The ability of the business operating system to capture, clean, and normalize data then to perform advanced predictive analytic functions and predictive simulations, alerting decision makers of deviations found from established normal operations, possibly providing recommendations in addition to analyzing all relevant asset and risk data to assist the client in formulating the most informed investment plan based upon a far greater volume of data than the client could analyze alone, thus performing the less crucial filtering and correlation of the data and leaving the informed creative decision making to the client.

According to a preferred embodiment of the invention, a system for trading environment quantification for investment vehicle management employing an advanced decision platform comprising: a high speed data retrieval and storage module stored in a memory of and operating on a processor of a computing device and configured to: retrieve a plurality of investment vehicle related data from a plurality of sources, transcribe the plurality of investment vehicle related data into a standard internal format using a plurality of software adapters specific to each sources application programming interface. A predictive analytics module stored in a memory of and operating on a processor of a computing device and configured to: normalize the investment vehicle related data for use in analytical algorithms, perform predictive analytics functions on normalized investment vehicle related data using both a plurality investment field specific functions and existing machine learning functions. A predictive simulation module stored in a memory of and operating on a processor of a computing device and configured to: normalize the investment vehicle related data for use in simulation algorithms, perform a plurality of investment field specific functions and predictive simulation functions on normalized investment vehicle related data. An indexed global tile module stored in a memory of and operating on a processor of a computing device and configured to: retrieve a plurality of geospatial tile data from a plurality of sources, retrieve a plurality of available map overlay data from a plurality of sources for use in conjunction with the indexed geospatial tile data, serve as an interface server for geospatial data requests, receive and insure safe storage of geospatial related data within the invention. An interactive display module stored in a memory of and operating on a processor of a computing device and configured to: display the results of predictive analytics functions as pre-programmed by analysts of an investigation, display the results of predictive simulation functions as pre-programmed by analysts of an investigation, display both real world and simulated geospatial data as pre-programmed by analysts of an investigation, re-display results in ways differing by additional representation programming instructions over the course of a viewing session.

According to a preferred embodiment of the invention, a system for trading environment quantification for investment vehicle management employing an advanced cyber-decision platform wherein at least one investment vehicle is leveraging statistical arbitrage. Wherein at least one investment vehicle is equities. Wherein at least one investment vehicle is asset backed securities. Wherein at least one investment vehicle is cell phone minutes. Wherein at least one investment vehicle is commodities. Wherein at least one investment vehicle is insurance linked securities. Wherein at least a portion of the indexed geospatial data is time series data. Wherein at least a portion of the indexed geospatial data is free form text data.

According to a preferred embodiment of the invention, a method for trading environment quantification for investment vehicle management employing an advanced decision platform the steps of: a) retrieving investment vehicle related data from a plurality of sources using a high speed data retrieval and storage module stored in a memory of and operating on a processor of a computing device; b) normalizing the retrieved investment vehicle related data using a predictive analytics module stored in a memory of and operating on a processor of a computing device; c) performing analytic functions on the retrieved investment vehicle related data using the predictive analytics module; d) performing simulation functions on the retrieved investment vehicle related data using the predictive analytics module; e) displaying results of investment vehicle analysis using an interactive display module.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
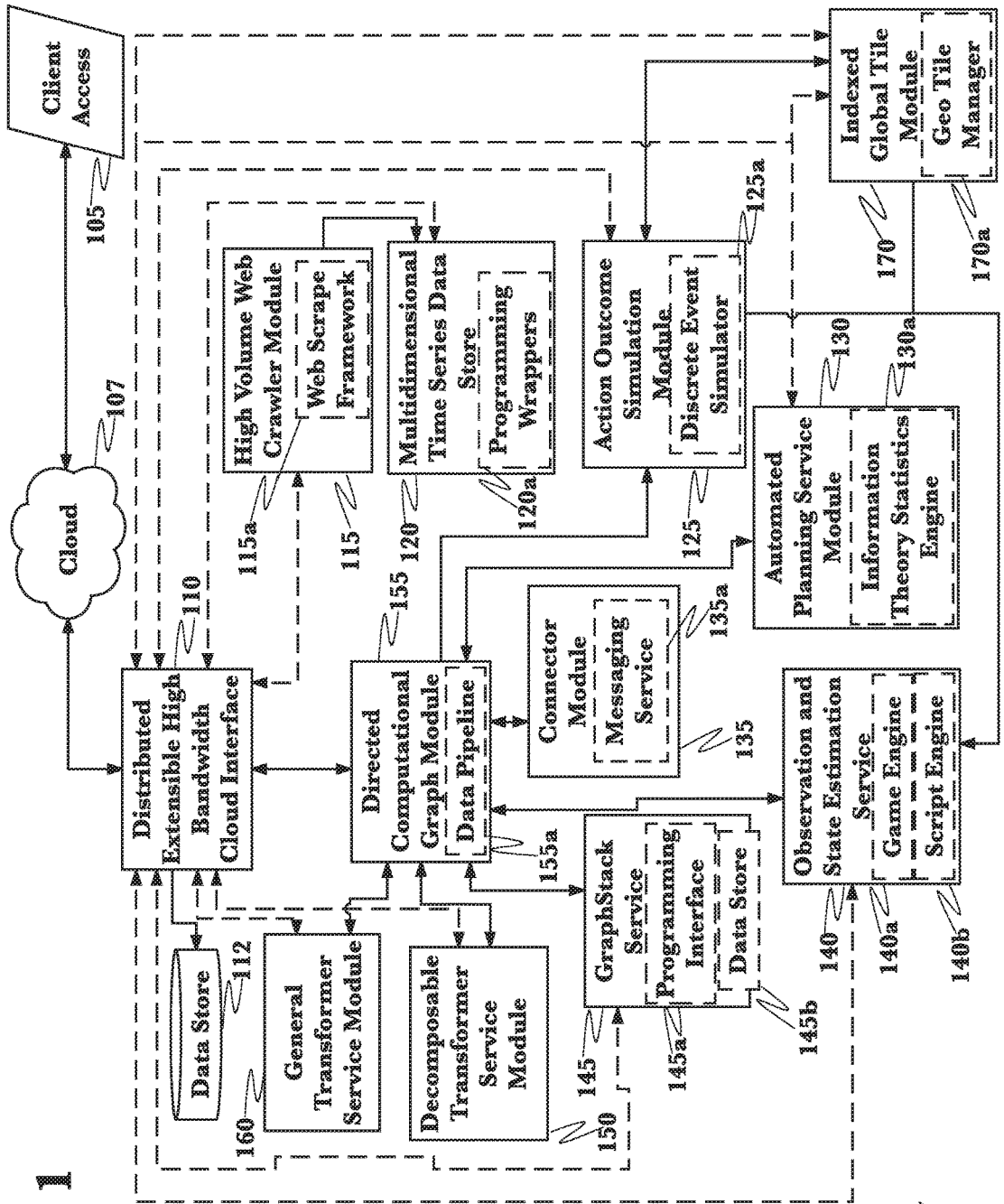
FIG. 1 is a diagram of an exemplary architecture of a business operating system according to an embodiment of the invention.

The inventor has conceived, and reduced to practice, a system for trading environment quantification for investment vehicle management employing an advanced decision platform.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Program functions and capabilities are not always attributed to a named software set or library. This in no instance implies that such a specific program, program function, or code library is not employed but is meant to allow time progression based changes to be made. In all cases at least one open source or proprietary software package providing the attributed functional result may be available and known to those skilled in the art or the algorithm needed to accomplish the function determinable by those skilled in the art.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155*a*, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115*a* of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to environmental factors at insured client infrastructure sites, component sensor readings and system logs of all insured client equipment, weather and catastrophic event reports for all regions an insured client occupies, political communiques from regions hosting insured client infrastructure and network service information captures such as, but not limited to news, capital funding opportunities and financial feeds, and sales, market condition and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145*a*, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145*a* and stores it in a graph-based data store 145*b* such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130*a* based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125*a* coupled with the end user facing observation and state estimation service 140 which is highly scriptable 140*b* as circumstances require and has a game engine 140*a* to more realistically stage possible outcomes of business decisions under consideration, allows business decision makers to investigate the probable outcomes of choosing one pending course of action over another based upon analysis of the current available data.

A significant proportion of the data that is retrieved and transformed by the business operating system, both in real world analyses and as predictive simulations that build upon intelligent extrapolations of real world data, include a geospatial component. The indexed global tile module 170 and its associated geo the manager 170*a* manages externally available, standardized geospatial tiles and may provide other components of the business operating system through programming methods to access and manipulate meta-information associated with geospatial tiles and stored by the system. Ability of the business operating system to manipulate this component over the time frame of an analysis and potentially beyond such that, in addition to other discriminators, the data is also tagged, or indexed, with their coordinates of origin on the globe, allows the system to better integrate and store analysis specific information with all available information within the same geographical region. Such ability makes possible not only another layer of transformative capability but, may greatly augment presentation of data by anchoring to geographic images including satellite imagery and superimposed maps both during presentation of real world data and simulation runs.

Figure 2:
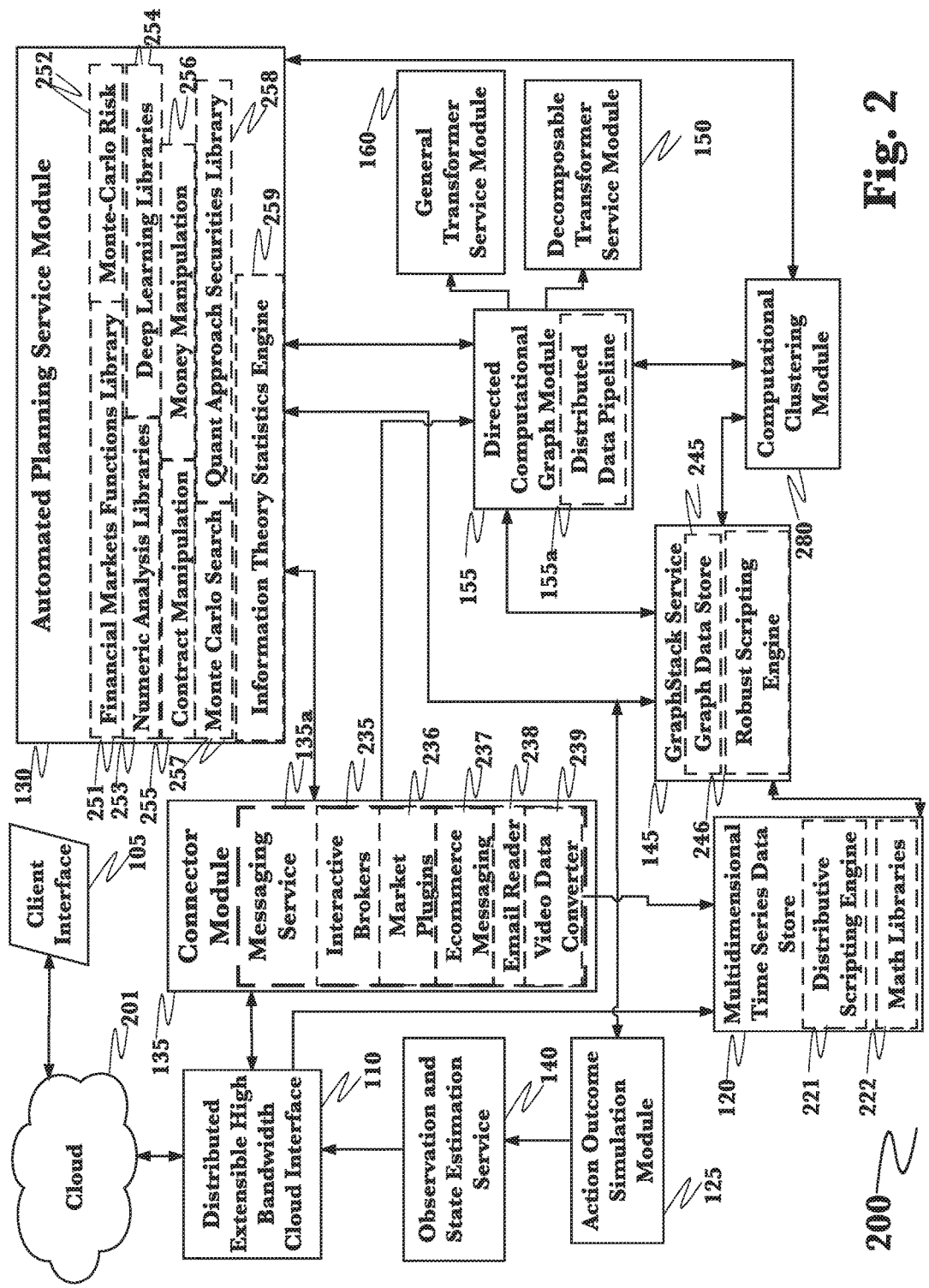
FIG. 2 is a diagram of modules of the business operating system configured specifically for use in investment vehicle management according to an embodiment of the invention.

FIG. 2 is a diagram of modules of the business operating system configured specifically for use in investment vehicle management according to an embodiment of the invention 200. The business operating system 100 previously disclosed in co-pending application Ser. No. 15/141,752 and applied in a role of cybersecurity in co-pending application Ser. No. 15/237,625, when programmed to operate as quantitative trading decision platform, is very well suited to perform advanced predictive analytics and predictive simulations 202 to produce investment predictions. Much of the trading specific programming functions are added to the automated planning service module 130 of the modified business operating system 100 to specialize it to perform trading analytics. Specialized purpose libraries may include but are not limited to financial markets functions libraries 251, Monte-Carlo risk routines 252, numeric analysis libraries 253, deep learning libraries 254, contract manipulation functions 255, money handling functions 256, Monte-Carlo search libraries 257, and quant approach securities routines 258. Pre-existing deep learning routines including information theory statistics engine 259 may also be used. The invention may also make use of other libraries and capabilities that are known to those skilled in the art as instrumental in the regulated trade of items of worth. Data from a plurality of sources used in trade analysis are retrieved, much of it from remote, cloud resident 201 servers through the system's distributed, extensible high bandwidth cloud interface 110 using the system's connector module 135 which is specifically designed to accept data from a number of information services both public and private through interfaces to those service's applications using its messaging service 135a routines, due to ease of programming, are augmented with interactive broker functions 235, market data source plugins 236, e-commerce messaging interpreters 237, business-practice aware email reader 238 and programming libraries to extract information from video data sources 239.

Other modules that make up the business operating system may also perform significant analytical transformations on trade related data. These may include the multidimensional time series data store 120 with its robust scripting features which may include a distributive friendly, fault-tolerant, real-time, continuous run prioritizing, programming platform such as, but not limited to Erlang/OTP 221 and a compatible but comprehensive and proven library of math functions of which the C++ math libraries are an example 222, data formalization and ability to capture time series data including irregularly transmitted, burst data; the GraphStack service 145 which transforms data into graphical representations for relational analysis and may use packages for graph format data storage such as Titan 245 or the like and a highly interface accessible programming interface an example of which may be Akka/Spray, although other, similar, combinations may equally serve the same purpose in this role 246 to facilitate optimal data handling; the directed computational graph module 155 and its distributed data pipeline 155a supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 105 in formats best suited to convey the both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 125. Data and simulation formatting may be completed or performed by the observation and state estimation service 140 using its ease of scripting and gaming engine to produce optimal presentation results.

In cases where there are both large amounts of data to be cleansed and formalized and then intricate transformations such as those that may be associated with deep machine learning, first disclosed in ¶067 of co-pending application Ser. No. 14/925,974, predictive analytics and predictive simulations, distribution of computer resources to a plurality of systems may be routinely required to accomplish these tasks due to the volume of data being handled and acted upon. The business operating system employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 280 to allow the configuration and management of such clusters during application of the business operating system. While the computational clustering module is drawn directly connected to specific co-modules of the business operating system these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 3:
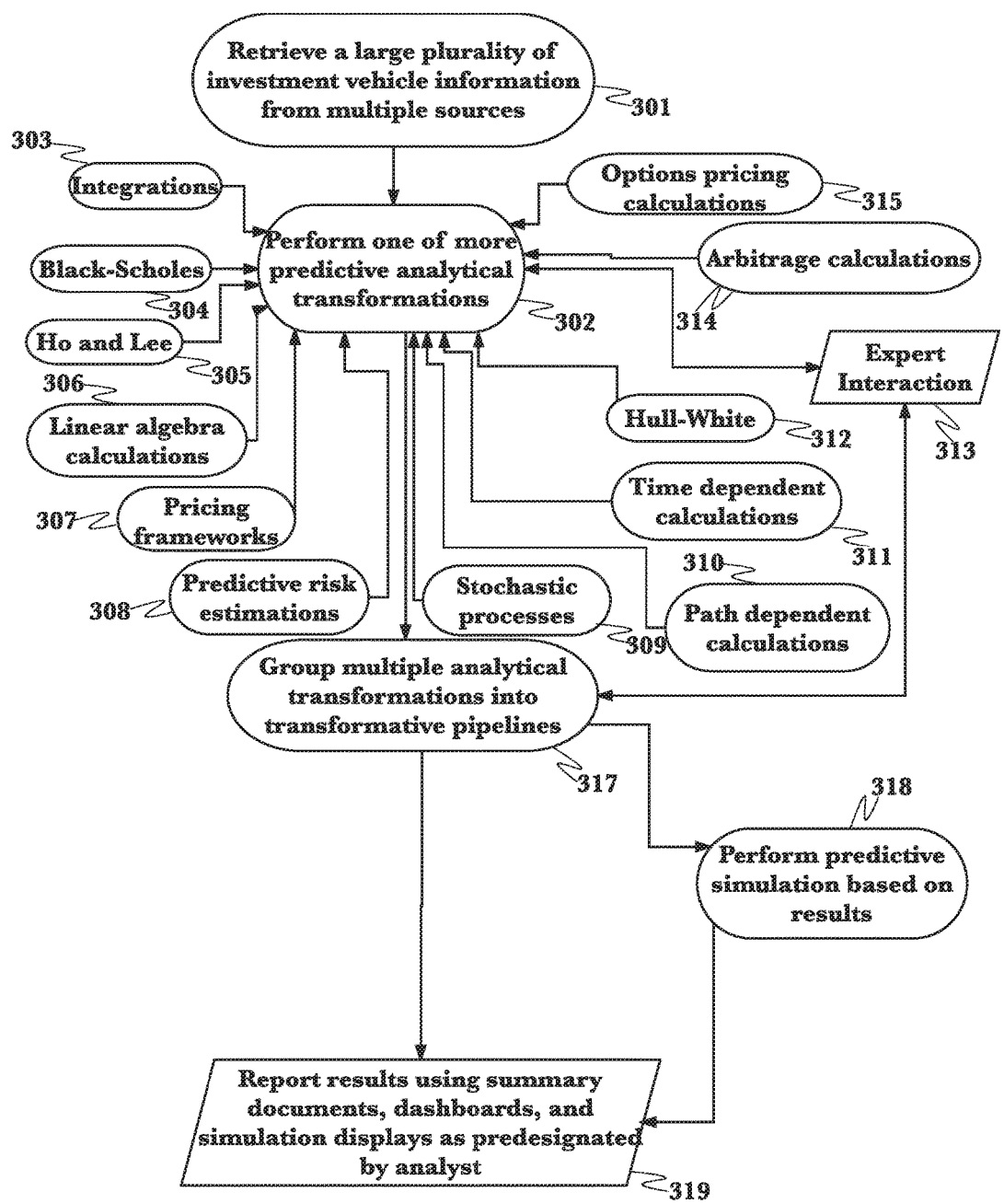
FIG. 3 is a flow diagram of an exemplary function of the business operating system in the calculation of future investment performance.

FIG. 3 is a flow diagram of an exemplary function of the business operating system in the calculation of future investment performance 300. New investment opportunities are continuously arising and the ability to profitably participate is of great importance. An embodiment of the invention 100 programmed analyze investment trading related data and recommend investment vehicles may greatly assist in development of a profitable plan in potential new markets. Retrieval or input of any prospective new market related data from a plurality of both public and available private or proprietary sources acts to seed the process 301, specific modules of the system such as the connector module 135 with its programmable messaging service 135a, the high volume web crawler 115 and the directed computational graph module 155, among possible others act to scrub, format and normalize data from many sources for use. Such data is then subjected to predictive analytical transformations, which may include traditional model functions such as but not limited to Black-Scholes mode 304, Ho and Lee 305 and Hull-White 312; trading field mechanical calculations such as but not limited to pricing frameworks 307, options pricing calculations 315 and arbitrage calculations 314; and more generalized analytics and simulation calculations such as, but not limited to integrations 303, linear algebra calculations 304, predictive risk estimations 308, stochastic processes functions 309, path dependent calculations 310, and time dependent calculations 311, all of which serve to create the most accurate assessment of investment fitness given a particular vehicle and the large volume of data that surrounds and affects its current and predictable future performance. During the calculation process, there may be information added to the body of data by the input interaction of an analyst or other human expert party 313 to increase the accuracy of the interim calculated projections as one of the designed functions of the business operating system is to retrieve, cleanse and aggregate the overwhelming volume of data connected to a field of decision allowing human users to concentrate on the creative and higher order aspects of that data.

Many of the calculations above are carried out as part of linear, branched or recursive pipelines using either the general transformer service module 160 which is specialized to rapidly perform linear transformation pipelines and decomposable transformer service module 150 for branching and recursive pipelines 317. Again expert interaction may be added at this point in the form of added data or modified programmed functions. These results may then be formatted for direct display, formatted for further analysis by third party solutions or directly stored for later analysis, possibly in combination with other data 319. Accumulated data may also be used in the creation of predictive simulations prior to display of that simulated information in the desired format 318, 319.

Figure 4:
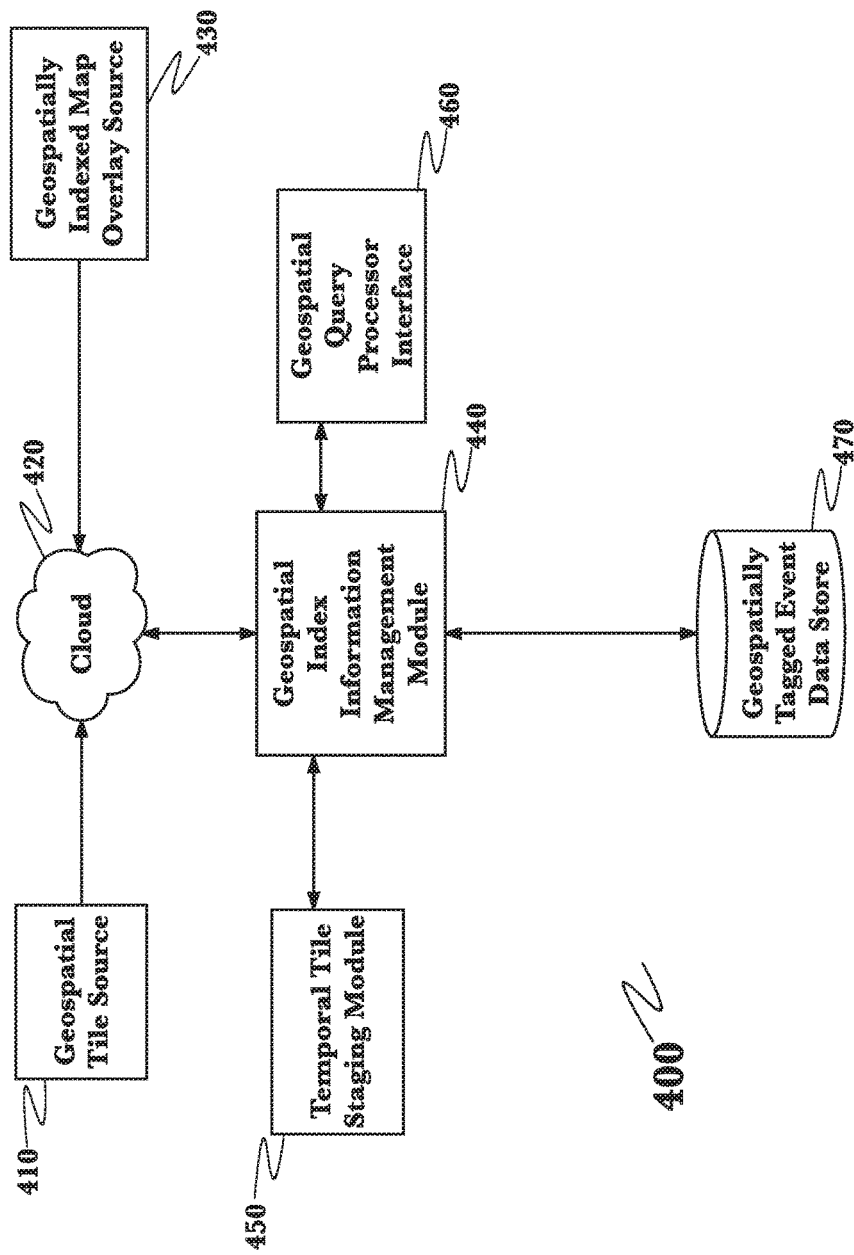
FIG. 4 is a diagram of an indexed global tile module as per one embodiment of the invention.

FIG. 4 is a diagram of an indexed global tile module 400 as per one embodiment of the invention. A significant amount of the data transformed and simulated by the business operating system has an important geospatial component. The indexed global tile module 170 allows both for the geo-tagging storage of data as retrieved by the system as a whole and for the manipulation and display of data using its geological data to augment the data's usefulness in transformation, for example creating ties between two independently acquired data points to more fully explain a phenomenon or in the display of real world or simulated results in their correct geospatial context for greatly increased visual comprehension and memorability. The indexed global tile module 170 may consist of a geospatial index information management module which retrieves indexed geospatial tiles from a cloud-based 420 source known to those skilled in the art and may also retrieved available geospatially indexed map overlays 410 for geospatial tiles 420 from a cloud-based source known to those skilled in the art. Tiles and their overlays, once retrieved, represent large amounts of potentially reusable data and are therefore stored for a pre-determined amount of time to allow rapid recall during one or more analyses on the system 450. To be useful it is required that both the transformative modules of the business operating system, such as, but not limited to the directed computational graph module 155, and the automated planning service module 130, as well as the action outcome simulation module 125 and observational and state estimation service 140 for display functions be capable of both accessing and manipulating the retrieved tiles and overlays. A geospatial query processor interface serves as a program interface between these system modules and the geospatial index information management module 440 which fulfills the resource requests through specialized direct tile manipulation protocols, which for simplistic example may include "get tile xxx," "zoom," "rotate," "crop," "shape," "stitch," and "highlight" just to name a very few options known to those skilled in the field. During analysis, the geospatial index information management module may control the assignment of geospatial data and the running transforming functions to one or more swim-lanes to expedite timely completion and correct storage of the resultant data with associated geotags. The transformed tiles with all associated transformation tagging may be stored for future review 470. Alternatively, just the geotagged transformation data or geotagged tile views may be stored 470 for future retrieval of the actual tile and review depending on the need and circumstance. There may also be occasion where time series data from specific geographical locations are stored in the multidimensional time series data store 120 with geo-tags provided by the geospatial index information management module 440.

Figure 5:
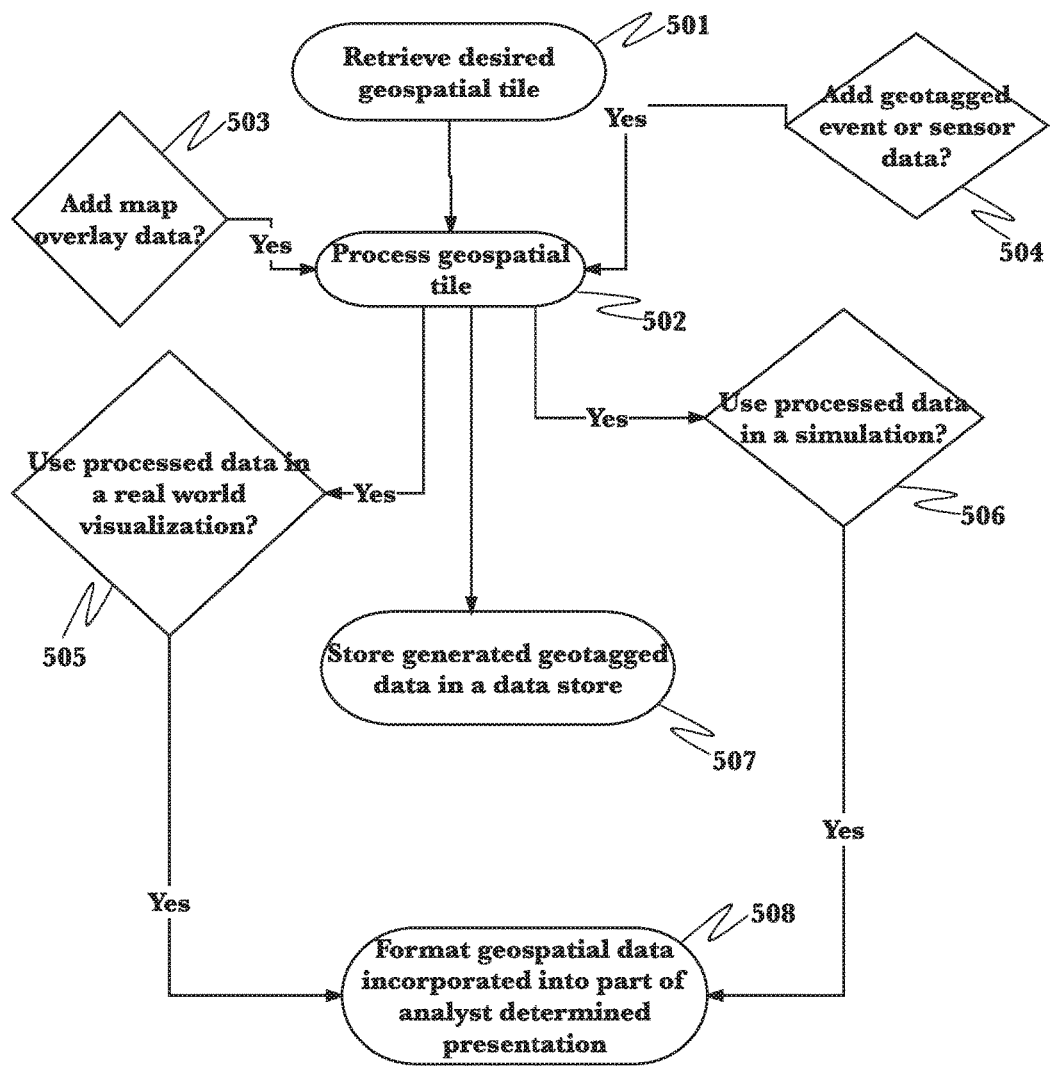
FIG. 5 is a flow diagram illustrating the function of the indexed global tile module as per one embodiment of the invention.

FIG. 5 is a flow diagram illustrating the function of the indexed global tile module 500 as per one embodiment of the invention. Predesignated, indexed geospatial tiles are retrieved from sources known to those skilled in the art 501. Available map overlay data, retrieved from one of multiple sources 503 known to those skilled in the art may be retrieved per user design. The geospatial tiles may then be processed in one or more of a plurality of ways according to the design of the running analysis 502, at which time geo-tagged event or sensor data may be associated with the indexed tile 504. Data relating to tile processing, which may include the tile itself is then stored for later review or analysis 507. The geo-data, in part, or in its entirety may be used in one or more transformations that are part of a real world data presentation 505. The geo-data in part of in its entirety may be used in one or more transformations that are part of a simulation 506. At least some of the geospatial data may be used in an analyst determined direct visual presentation or may be formatted and transmitted for use in third party solutions 508.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
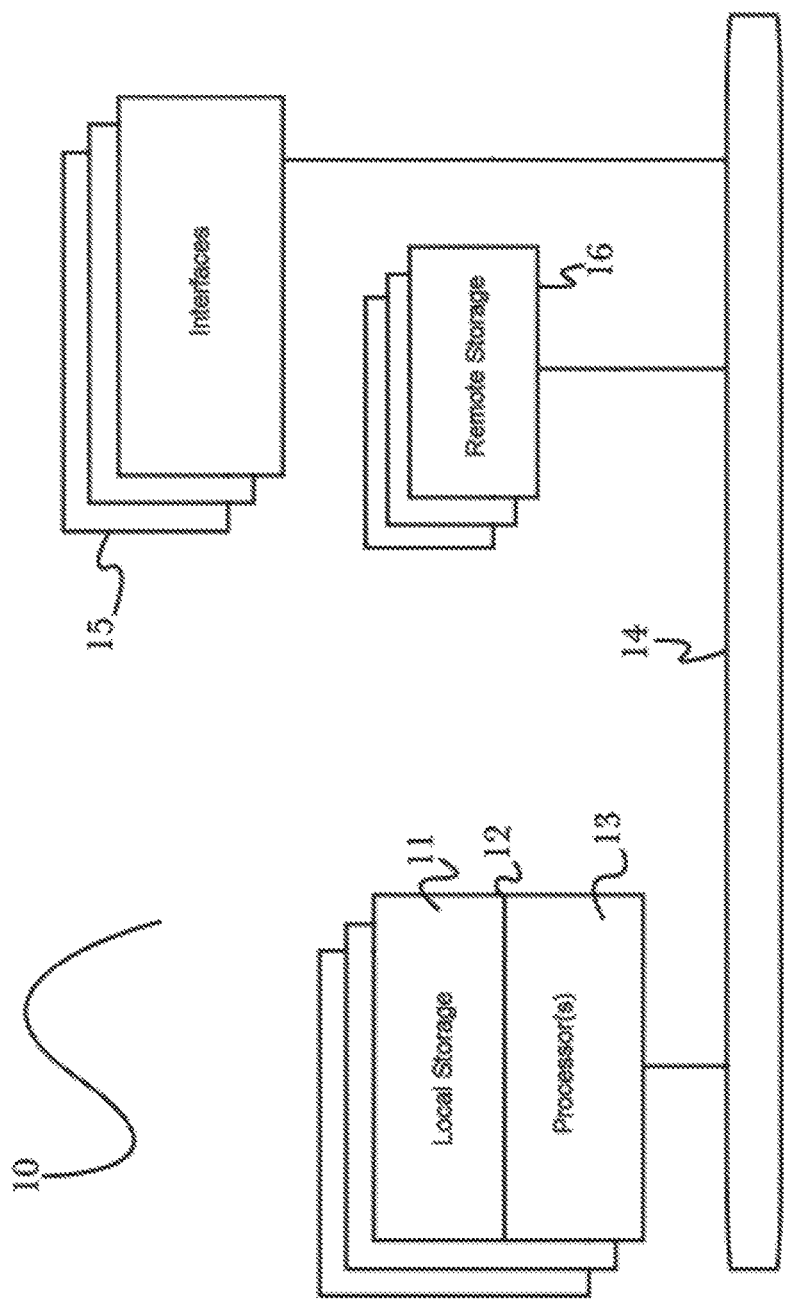
FIG. 6 is a block diagram illustrating an exemplary hardware architecture of a computing device used in various embodiments of the invention.

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
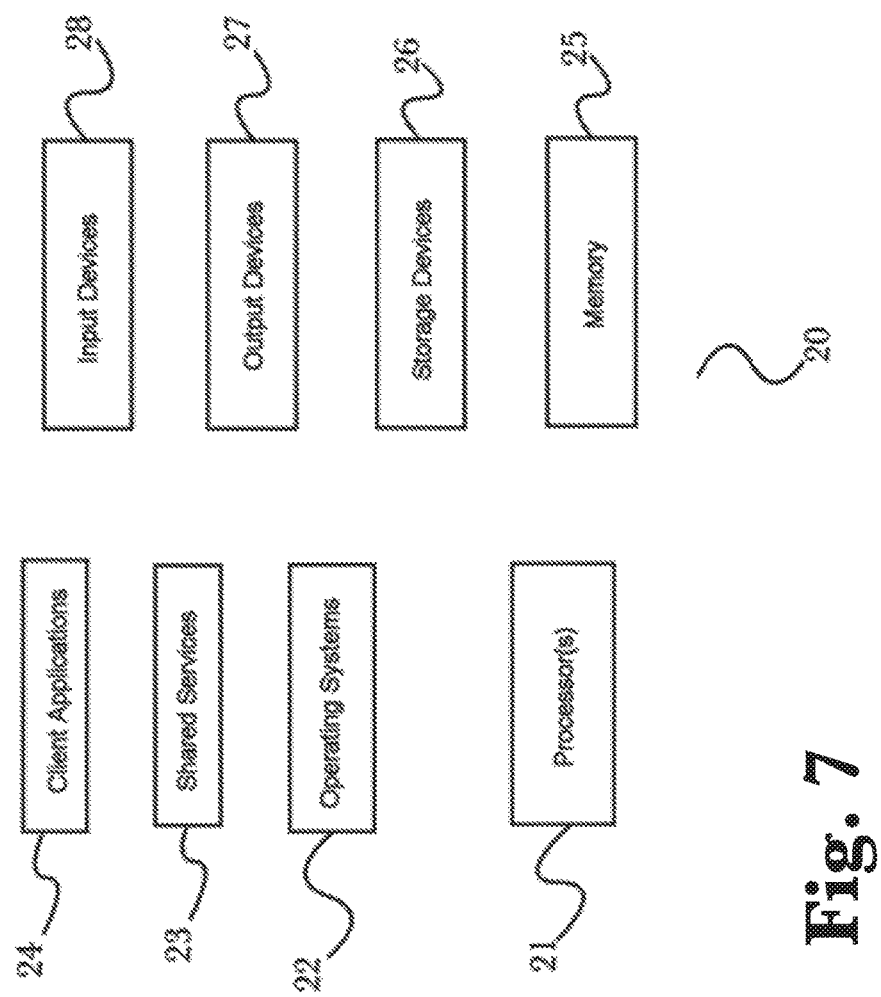
FIG. 7 is a block diagram illustrating an exemplary logical architecture for a client device, according to various embodiments of the invention.

In some embodiments, systems according to the present invention may be implemented on a standalone computing system. Referring now to FIG. 7, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 8:
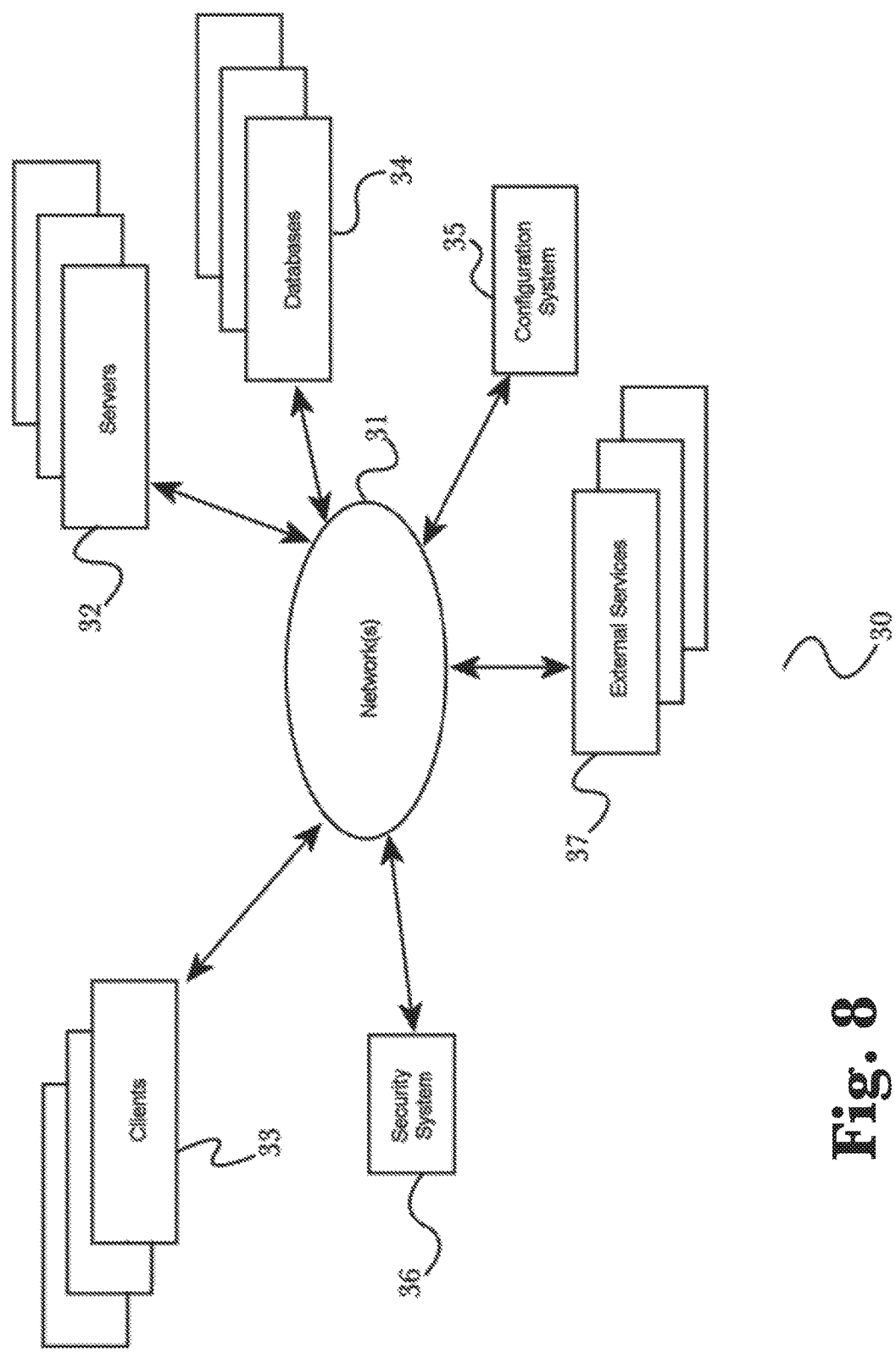
FIG. 8 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 8, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 9:
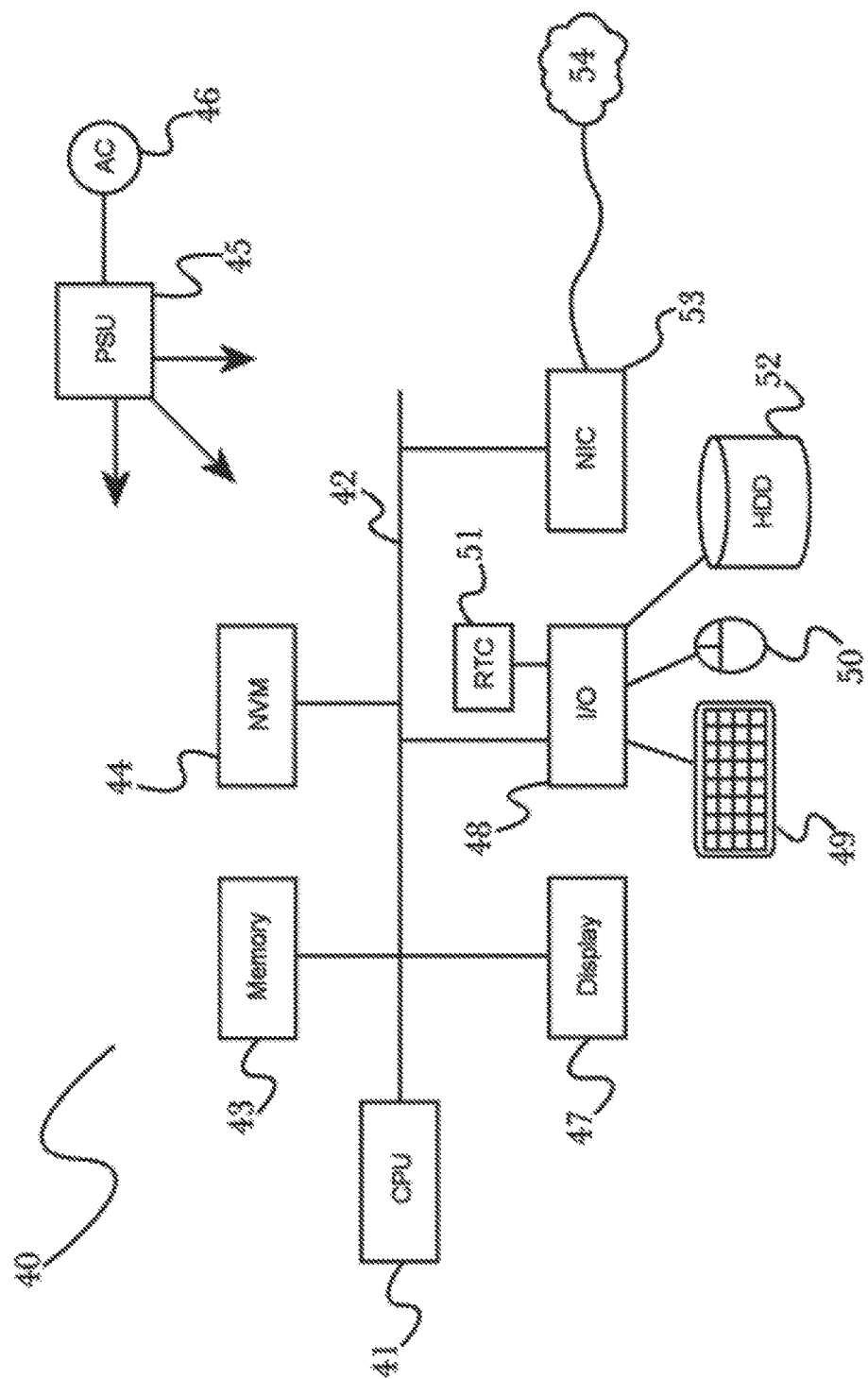
FIG. 9 is another block diagram illustrating an exemplary hardware architecture of a computing device used in various embodiments of the invention.

FIG. 9 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The insurance decision platform described here is built upon highly programmable computer software architecture that may serve as the basis of a plurality of specific use systems. For example the architecture and base programming described here 100 being employed as an trading decision platform 200 is the same computer architecture described in ¶032 and ¶033 of co-pending application Ser. No. 15/237,625 and specifically used as a cyber-attack detection mitigation and remediation platform in ¶035 through ¶037 of co-pending application Ser. No. 15/237,625. The same base architecture and programming, presented here and previously and designed to be readily augmented by application specific data stores and programming may take on the capabilities or personalities of a plurality of highly advanced platforms in a plurality of fields both business and scientific where large volumes of data, at least a portion of which may enter the system in bursts or at irregular intervals is present and data which may need normalization and transformation as well as correlation of possibly hard to discern commonalities. The personality instilled platform may also be used in these fields to perform reliable analytics and run reliable simulations on the existing data to allow operators to intelligently determine next direction to implement (and which next direction potentially not to implement) potentially saving both time, money and resources. In summary, the business operating system disclosed here and in co-pending applications may be imagined more as a set of software engineered stations in a highly and readily modifiable virtual production line than as only a cyber-attack detection, mitigation and remediation system or as only an trading decision platform as it is both and can be more.

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system for trading environment quantification during investment vehicle management employing an advanced decision platform comprising:
a high speed data retrieval and storage module stored in a memory of and operating on a processor of a computing device and configured to:
retrieve a plurality of investment vehicle related data from a plurality of sources;
transcribe the plurality of investment vehicle related data into a standard internal format using a plurality of software adapters specific to each source's application programming interface;
a predictive analytics module stored in a memory of and operating on a processor of a computing device and configured to:
normalize the investment vehicle related data for use in analytical algorithms;
perform predictive analytics functions on normalized investment vehicle related data using both a plurality of investment field specific functions and existing machine learning functions; and
output results of the predictive analytics functions;
a predictive simulation module stored in a memory of and operating on a processor of a computing device and configured to:
normalize the investment vehicle related data for use in simulation algorithms;
perform a plurality of investment field specific functions and predictive simulation functions on normalized investment vehicle related data; and
output results of the investment field specific functions and results of the predictive simulation functions;
an indexed global tile module stored in a memory of and operating on a processor of a computing device and configured to:
retrieve a plurality of indexed geospatial tile data from a plurality of sources;
retrieve a plurality of available map overlay data from a plurality of sources for use in conjunction with the indexed geospatial tile data;
serve as an interface server for geospatial data requests;
receive and insure safe storage of geospatial related data within the invention; and
an interactive display module stored in a memory of and operating on a processor of a computing device and configured to:
initiate a viewing session;
display the results of the predictive analytics functions as pre-programmed by analysts of an investigation;
display the results of the predictive simulation functions as pre-programmed by analysts of an investigation;
display both real world and simulated geospatial data as pre-programmed by analysts of an investigation;
re-display results in ways differing by additional representation programming instructions over the course of the viewing session.

2. The system of claim 1, wherein at least one investment vehicle leverages statistical arbitrage.

3. The system of claim 1, wherein at least one investment vehicle is equities.

4. The system of claim 1, wherein at least one investment vehicle is asset backed securities.

5. The system of claim 1, wherein at least one investment vehicle is cell phone minutes.

6. The system of claim 1, wherein at least one investment vehicle is commodities.

7. The system of claim 1 wherein at least one investment vehicle is insurance linked securities.

8. The system of claim 1, wherein at least a portion of the indexed geospatial data is time series data.

9. The system of claim 1, wherein at least a portion of the indexed geospatial data is free form text data.

10. A method for trading environment quantification for investment vehicle management employing an advanced cyber-decision platform comprising the steps of:
   a) retrieving investment vehicle related data from a plurality of sources using a high speed data retrieval and storage module stored in a memory of and operating on a processor of a computing device;
   b) normalizing the retrieved investment vehicle related data using a predictive analytics module stored in a memory of and operating on a processor of a computing device;
   c) performing analytic functions on the retrieved investment vehicle related data using the predictive analytics module and outputting results of the predictive analytics functions;
   d) performing simulation functions on the retrieved investment vehicle related data using the predictive analytics module and outputting results of the investment field specific functions and results of the predictive simulation functions; and
   e) displaying results of investment vehicle analysis in a plurality of investigator determined views using an interactive display module.

11. The method of claim 10, wherein at least one investment vehicle leverages statistical arbitrage.

12. The method of claim 10, wherein at least one investment vehicle is equities.

13. The method of claim 10, wherein at least one investment vehicle is asset backed securities.

14. The method of claim 10, wherein at least one investment vehicle is cell phone minutes.

15. The method of claim 10, wherein at least one investment vehicle is commodities.

16. The method of claim 10 wherein at least one investment vehicle is insurance linked securities.

17. The method of claim 10, wherein at least a portion of the indexed geospatial data is time series data.

18. The method of claim 10, wherein at least a portion of the indexed geospatial data is free form text data.

* * * * *